US012269376B1

(12) United States Patent
Mellas et al.

(10) Patent No.: US 12,269,376 B1
(45) Date of Patent: Apr. 8, 2025

(54) SEAT RISER

(71) Applicant: Protomet Corporation, Oak Ridge, TN (US)

(72) Inventors: Nathan Mellas, Oak Ridge, TN (US); Barrett Tillman, Oak Ridge, TN (US); Stewart Boyd, Oak Ridge, TN (US); William Matthew Reid, Oak Ridge, TN (US)

(73) Assignee: Protomet Corporation, Oak Ridge, TN (US)

( * ) Notice: Subject to any disclaimer, the term of this patent is extended or adjusted under 35 U.S.C. 154(b) by 0 days.

(21) Appl. No.: 18/740,690

(22) Filed: Jun. 12, 2024

Related U.S. Application Data

(60) Provisional application No. 63/507,777, filed on Jun. 13, 2023.

(51) Int. Cl.
*B60N 2/16* (2006.01)
*B60N 2/14* (2006.01)

(52) U.S. Cl.
CPC ............. *B60N 2/1605* (2013.01); *B60N 2/14* (2013.01); *B60N 2/164* (2013.01); *B60N 2/1685* (2013.01)

(58) Field of Classification Search
CPC ........ B60N 2/1605; B60N 2/14; B60N 2/164; B60N 2/1685
USPC ...................................................... 296/65.07
See application file for complete search history.

(56) References Cited

U.S. PATENT DOCUMENTS

| 3,445,147 | A | * | 5/1969 | Niemi | A47C 3/18 |
| | | | | | 384/420 |
| 3,659,895 | A | * | 5/1972 | Dresden | B60N 2/14 |
| | | | | | 248/416 |
| 4,436,270 | A | * | 3/1984 | Muraishi | B60N 2/146 |
| | | | | | 248/416 |
| 4,792,188 | A | * | 12/1988 | Kawashima | B60N 2/146 |
| | | | | | 297/344.21 |
| 4,834,452 | A | * | 5/1989 | Goodrich | B60N 2/0856 |
| | | | | | 297/240 |
| 5,636,884 | A | * | 6/1997 | Ladetto | B60N 2/14 |
| | | | | | 296/65.09 |
| 7,036,883 | B1 | * | 5/2006 | Thompson | B60N 2/0224 |
| | | | | | 297/344.24 |
| 7,438,339 | B2 | * | 10/2008 | Abraham | B60N 2/3018 |
| | | | | | 296/65.09 |
| 8,998,326 | B2 | * | 4/2015 | DeCraene | B60N 2/062 |
| | | | | | 296/65.11 |

(Continued)

FOREIGN PATENT DOCUMENTS

WO WO-9928146 A1 * 6/1999 ............. B60N 2/143

*Primary Examiner* — Hilary L Gutman
(74) *Attorney, Agent, or Firm* — Robinson IP Law, PLLC

(57) ABSTRACT

Various implementations include a seat riser system. The system includes a base and a seat. The base has a base center line, a first base end, a second base end spaced apart along the base center line, a first base side, and a second base side spaced apart from the first base side. The seat has a seat center line, a first seat end, a second seat end spaced apart along the seat center line, a first seat side, a second seat side spaced apart from the first seat side, and a bottom seat surface rotationally coupled to the base such that the seat is rotatable about a seat rotational axis. The seat rotational axis is spaced apart from the seat center line such that the seat rotational axis is closer to the first seat side than it is to the second seat side.

19 Claims, 13 Drawing Sheets

(56) References Cited

U.S. PATENT DOCUMENTS

| | | | | |
|---|---|---|---|---|
| 9,415,702 B2* | 8/2016 | Auger | | B60N 2/14 |
| 9,579,994 B2* | 2/2017 | Muehlbauer | | B60N 2/143 |
| 9,623,769 B1* | 4/2017 | Roeglin | | F16H 37/12 |
| 10,076,976 B2* | 9/2018 | Roeglin | | B60N 2/146 |
| 10,500,988 B1* | 12/2019 | Faruque | | B60N 2/933 |
| 10,640,017 B2* | 5/2020 | Murakami | | B60N 2/0705 |
| 10,807,504 B2* | 10/2020 | Line | | B60N 2/0292 |
| 11,214,179 B2* | 1/2022 | Line | | B60N 2/3047 |
| 11,225,172 B2* | 1/2022 | Mozurkewich | | B60N 2/065 |
| 11,254,240 B2* | 2/2022 | Baccouche | | B60N 2/065 |
| 11,447,044 B1 | 9/2022 | Boks | | |
| 2005/0116520 A1* | 6/2005 | Wieclawski | | B60N 2/14 |
| | | | | 297/344.21 |
| 2006/0250011 A1* | 11/2006 | Sawdy | | B60N 2/14 |
| | | | | 280/250.1 |
| 2007/0284905 A1* | 12/2007 | Bailey | | B60N 2/14 |
| | | | | 296/65.07 |
| 2009/0127908 A1* | 5/2009 | Kucharski | | B60N 2/14 |
| | | | | 297/344.24 |
| 2009/0174246 A1* | 7/2009 | Kaip | | B60N 2/02246 |
| | | | | 297/344.21 |
| 2015/0035334 A1* | 2/2015 | Roth | | B60N 2/06 |
| | | | | 297/344.24 |
| 2017/0120776 A1* | 5/2017 | Slungare | | B60N 2/14 |
| 2020/0086997 A1* | 3/2020 | Suarez | | B60N 2/43 |
| 2020/0361349 A1* | 11/2020 | Line | | B60N 2/0284 |
| 2021/0170921 A1* | 6/2021 | Seibold | | B60N 2/143 |
| 2022/0161694 A1* | 5/2022 | Numajiri | | B60N 2/14 |
| 2023/0020082 A1* | 1/2023 | Lee | | B60N 2/14 |

* cited by examiner

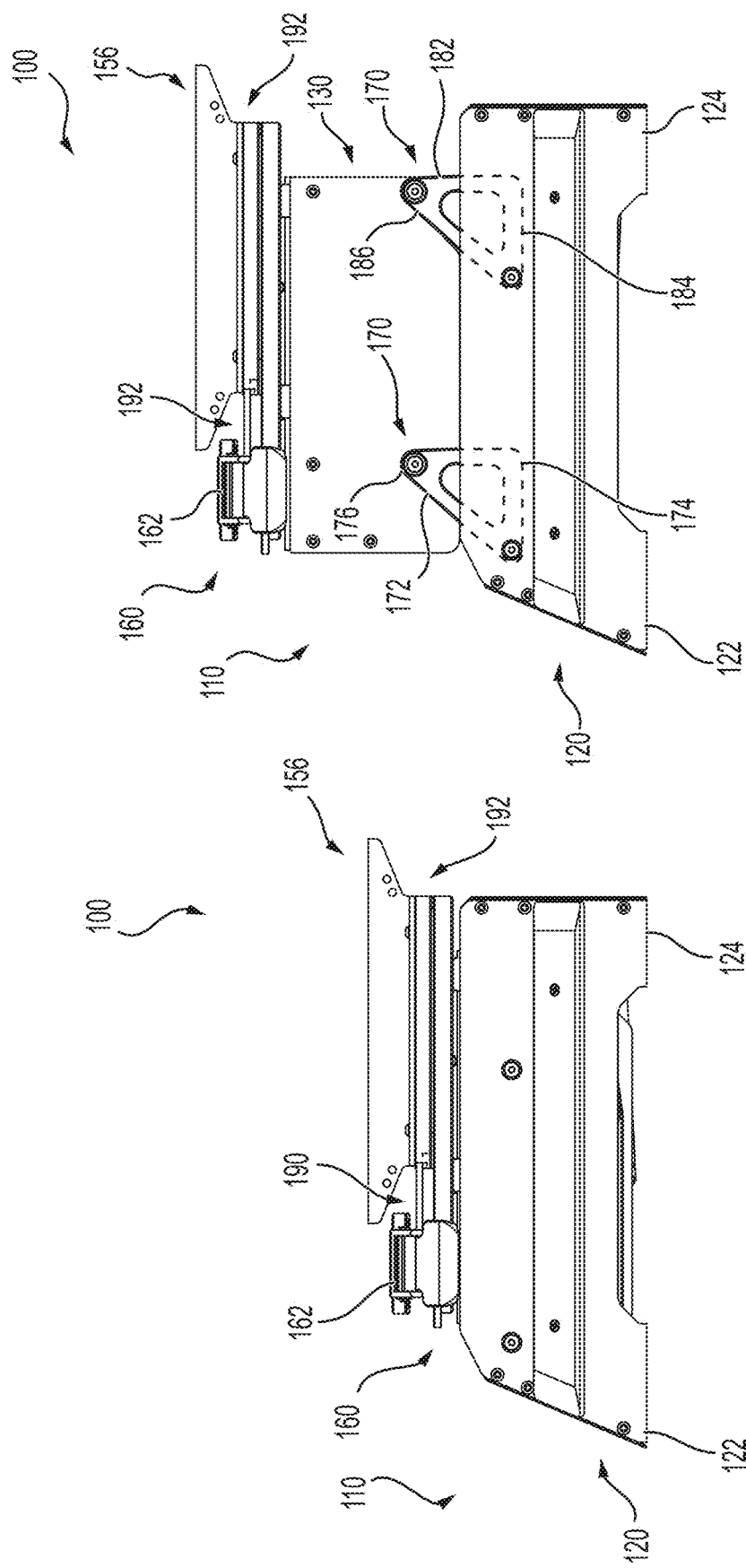

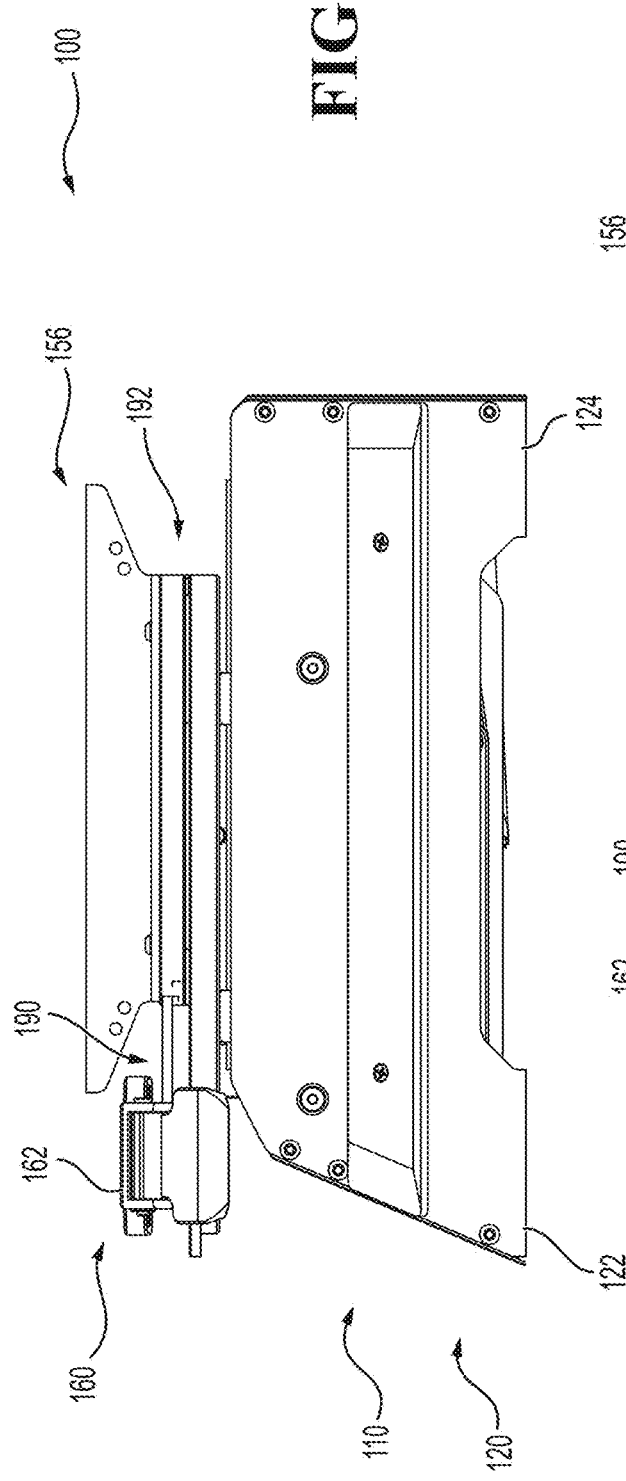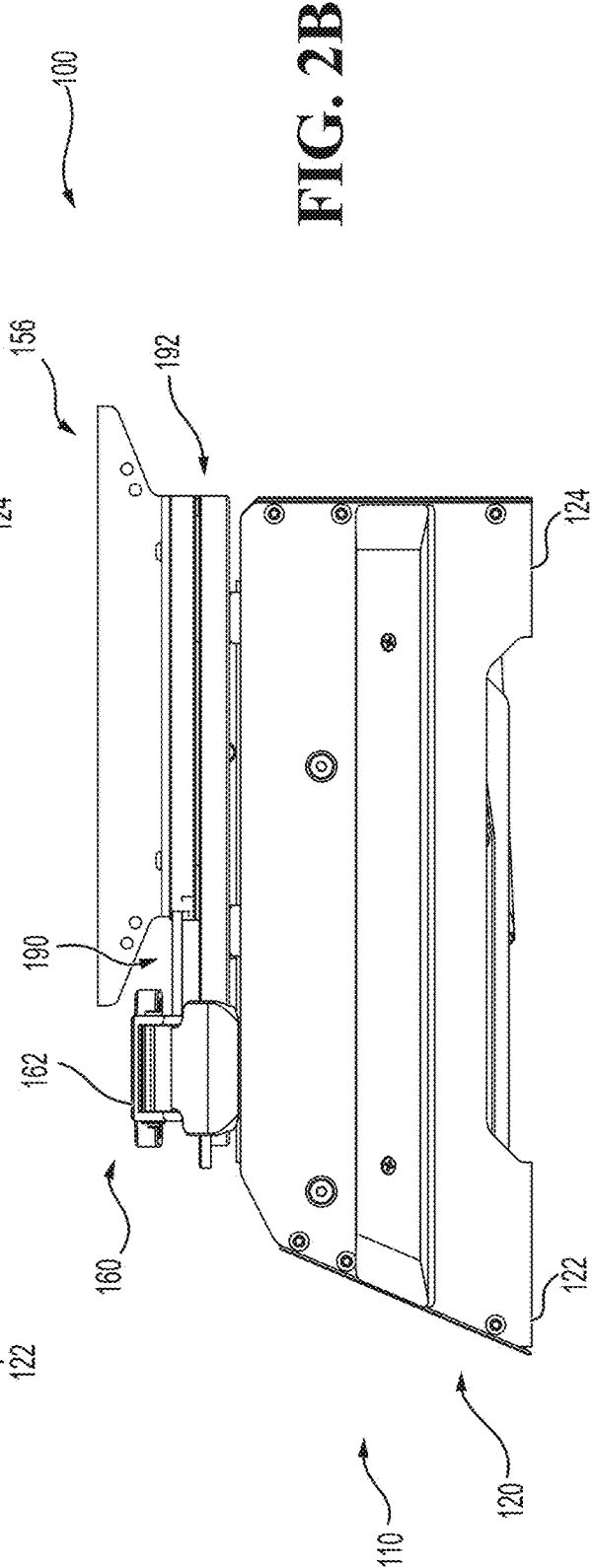

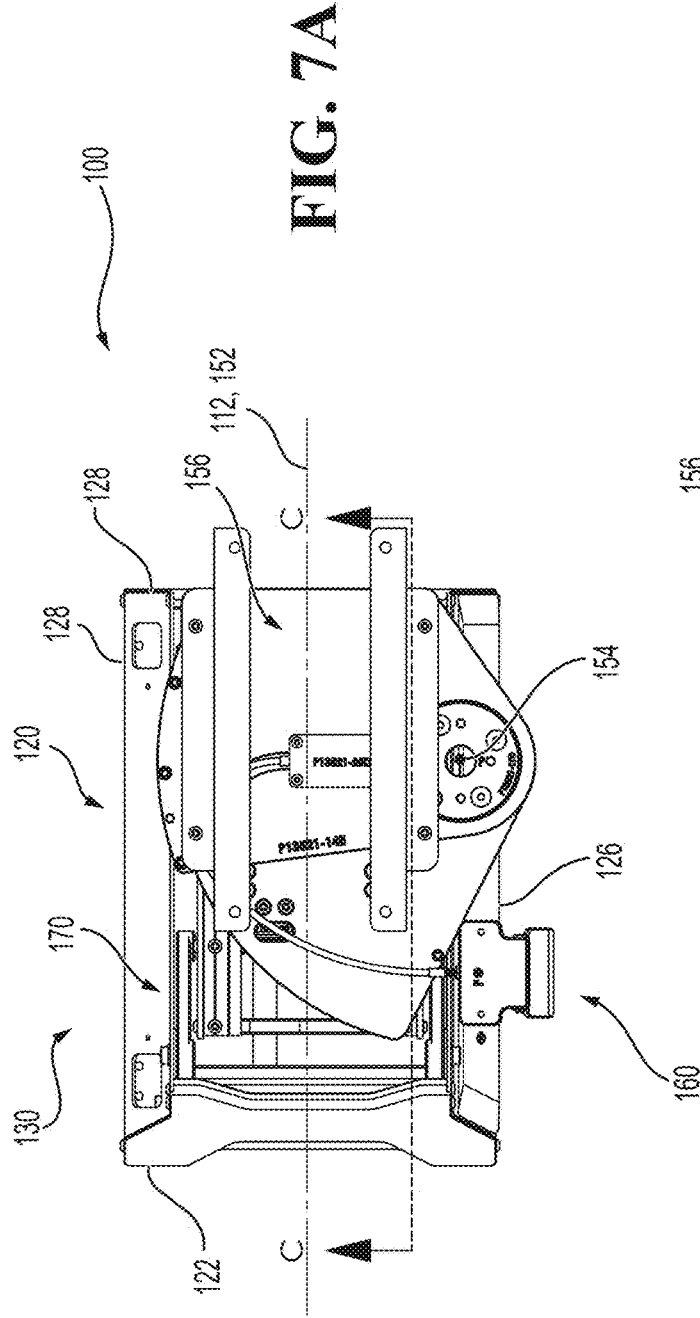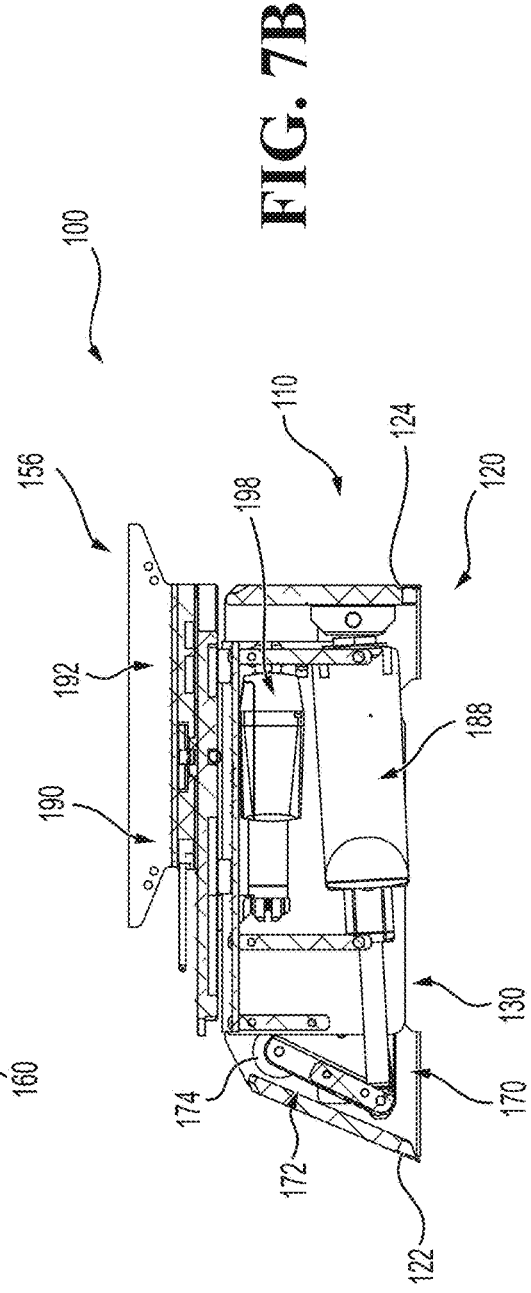

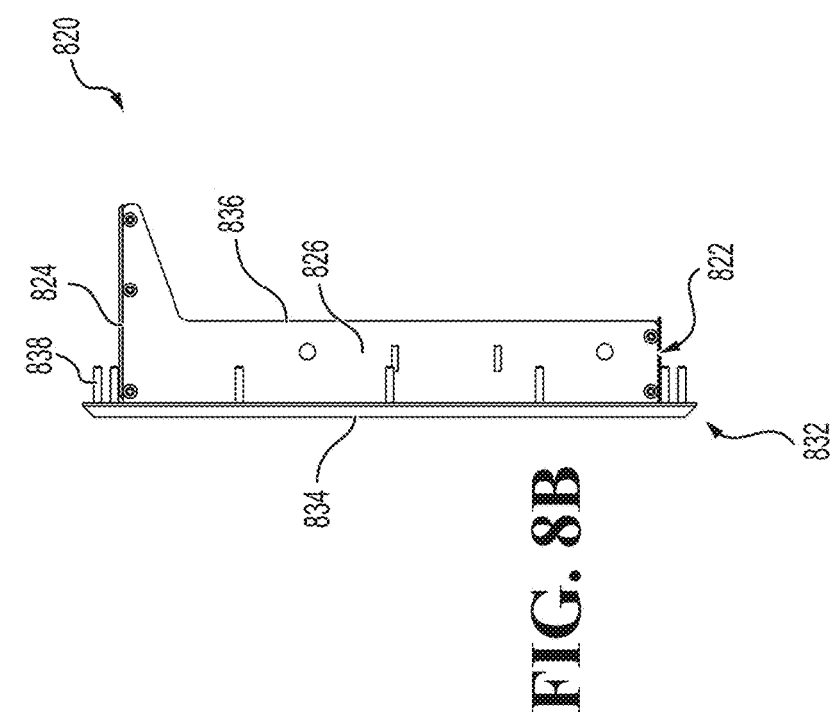
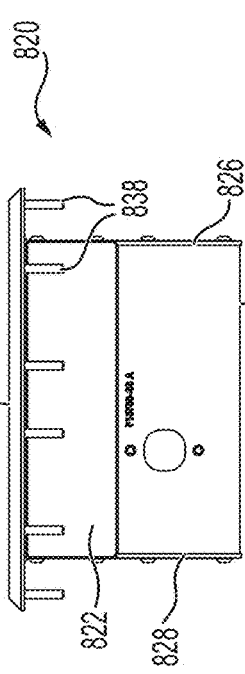
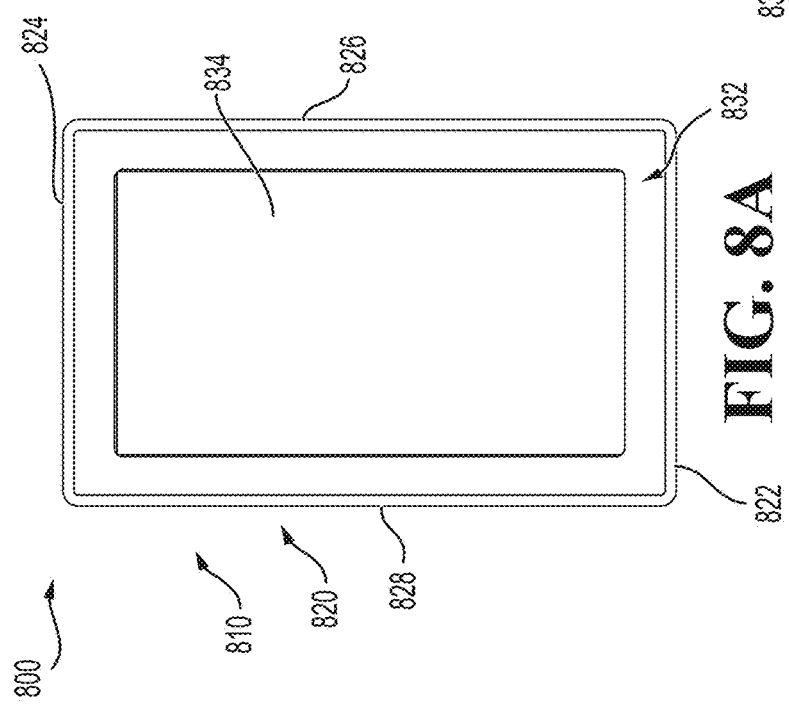

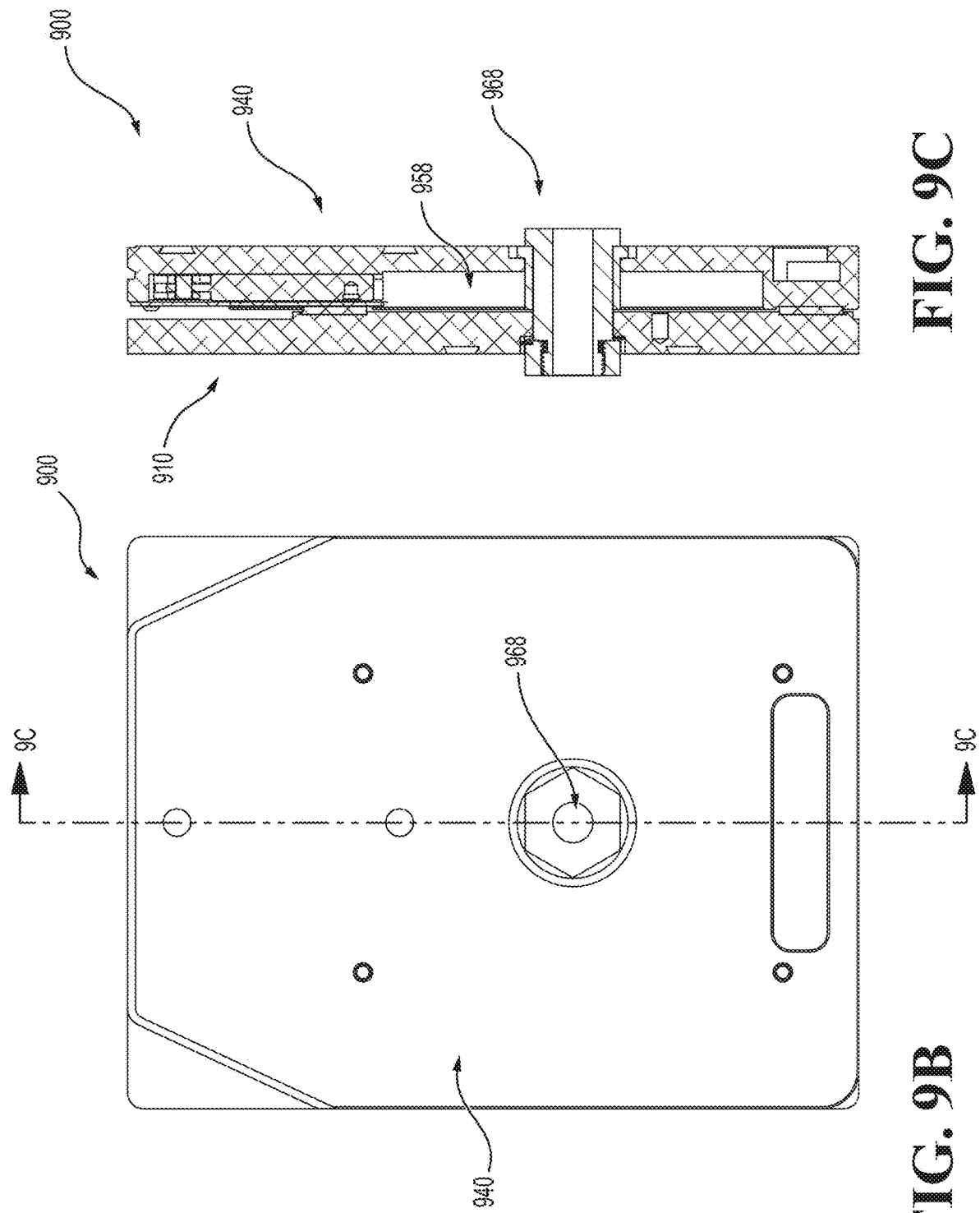

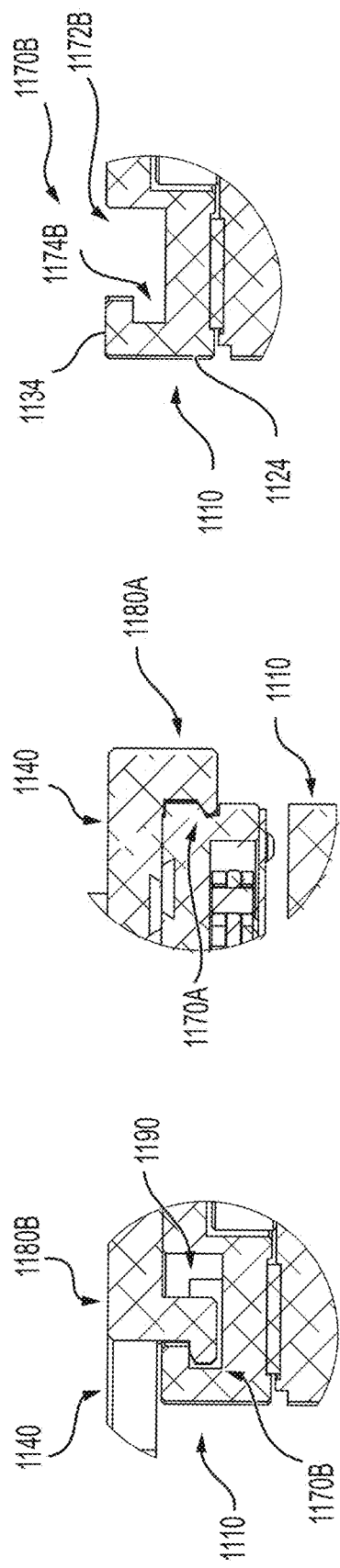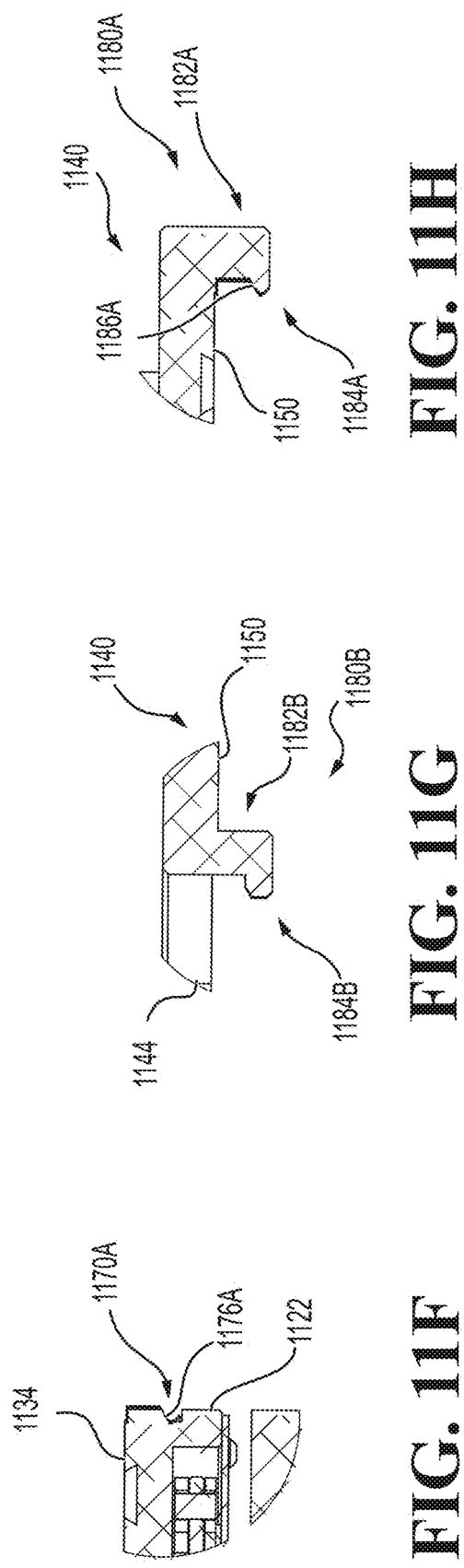
FIG. 11C  FIG. 11D  FIG. 11E
FIG. 11F  FIG. 11G  FIG. 11H

SEAT RISER

BACKGROUND

Most watercraft and other vehicles include seats for drivers and passengers to sit in when on the watercraft or vehicle. In some watercraft and vehicles, seats may have the ability to be swiveled such that a user sitting in the seat can face a variety of directions.

However, the base of these seats often have a square or rectangle footprint and may have a reclined backrest such that the corners of the backrest extend even further from the footprint of the base. As these seats rotate, the corners of the seat extend further than the sides of the seat which can collide with shifter panels, controls, and other panels of the watercraft or vehicle.

SUMMARY

Various implementations include a seat riser system. The system includes a base and a seat. The base has a base center line, a first base end, a second base end opposite and spaced apart from the first base end along the base center line, a first base side extending between the first base end and the second base end, and a second base side opposite and spaced apart from the first base side. The seat has a seat center line, a first seat end, a second seat end opposite and spaced apart from the first seat end along the seat center line, a first seat side extending between the first seat end and the second seat end, a second seat side opposite and spaced apart from the first seat side, and a bottom seat surface rotationally coupled to the base such that the seat is rotatable about a seat rotational axis between a first rotational position and a second rotational position. The seat is movable in a direction having a component vector in a direction parallel to the rotational axis and relative to the base between a raised position and a lowered position. The base includes a four-bar linkage. The four-bar linkage is movable to cause the seat to move between the raised position and the lowered position.

In some implementations, the system further includes a hollow shaft rotationally coupling the seat to the base. In some implementations, at least one wire extends through the hollow shaft.

In some implementations, the base further includes a pivot hinge. In some implementations, the bottom seat surface is rotationally coupled to the base by the pivot hinge.

In some implementations, the system further includes a locking mechanism movable between a locked position and an unlocked position. In some implementations, the seat is prevented from rotating between the first rotational position and the second rotational position in the locked position and is allowed to rotate between the first rotational position and the second rotational position in the unlocked position. In some implementations, the locking mechanism includes a handle for moving the locking mechanism from the locked position to the unlocked position.

In some implementations, the system further includes a rotation actuator actuatable to cause the seat to rotate about the seat rotational axis between the first rotational position and the second rotational position. In some implementations, the seat is rotatable to a third rotational position disposed rotationally between the first rotational position and the second rotational position. In some implementations, the rotation actuator is actuatable to selectively cause the seat to rotate about the seat rotational axis to the third rotational position.

In some implementations, the seat is movable parallel to the center line and relative to the base between a fore position and an aft position. In some implementations, the base includes one or more rails and one or more bearings slidably engaging the one or more rails. In some implementations, the seat is movably coupled to the base by the one or more rails and the one or more bearings. In some implementations, the system further includes a fore actuator actuatable to cause the seat to move between the fore position and the aft position. In some implementations, the seat is movable to an intermediate fore position disposed between the fore position and the aft position. In some implementations, the fore actuator is actuatable to selectively cause the seat to move parallel to the center line and relative to the base to the intermediate fore position.

In some implementations, the seat rotational axis is spaced apart from the seat center line such that the seat rotational axis is closer to the first seat side than it is to the second seat side. In some implementations, the seat rotational axis is spaced apart from the base center line such that the seat rotational axis is closer to the first base side than it is to the second base side. In some implementations, the system further includes a raising actuator actuatable to cause the seat to move between the raised position and the lowered position. In some implementations, the seat is movable to an intermediate raised position disposed between the raised position and the lowered position. In some implementations, the raising actuator is actuatable to selectively cause the seat to move to the intermediate position.

In some implementations, the base further includes a main portion and an intermediate portion. In some implementations, the main portion includes the four-bar linkage. In some implementations, the four-bar linkage is movable to cause the intermediate portion to move between a raised position and a lowered position. In some implementations, the bottom seat surface is rotationally coupled to the intermediate portion of the base. In some implementations, the intermediate portion of the base includes one or more rails and one or more bearings slidably engaging the one or more rails. In some implementations, the seat is movably coupled to the intermediate portion of the base by the one or more rails and the one or more bearings to cause the seat to move between a fore position and an aft position. In some implementations, the base further includes a pivot hinge coupled to the one or more rails and one or more bearings. In some implementations, the bottom seat surface is rotationally coupled to the base by the pivot hinge.

In some implementations, the base further includes a main portion and an intermediate portion. In some implementations, the main portion includes one or more rails and one or more bearings movably engaging the one or more rails. In some implementations, the one or more bearings are movable relative to the one or more rails to cause the intermediate portion of the base to move between a fore position and an aft position. In some implementations, the bottom seat surface is rotationally coupled to the intermediate portion of the base. In some implementations, the intermediate portion includes the four-bar linkage. In some implementations, the base further includes a pivot hinge coupled to the four-bar linkage. In some implementations, the bottom seat surface is rotationally coupled to the base by the pivot hinge.

In some implementations, the base includes a top base side and a bottom base side opposite and spaced apart from the top base side. In some implementations, the seat is closer to the top base side than it is to the bottom base side. In some implementations, the base further includes a coupling flange extending outwardly from at least one of the first base end, the second base end, the first base side, or the second base side. In some implementations, the coupling flange is spaced apart from the bottom base side such that, when the coupling flange is coupled to a floor surface, the bottom base side is disposed opposite the floor surface from the seat.

In some implementations, the coupling flange extends outwardly from at least two of the first base end, the second base end, the first base side, or the second base side. In some implementations, the coupling flange extends outwardly from each of the first base end, the second base end, the first base side, and the second base side.

In some implementations, the coupling flange is disposed on a same side of the floor surface as the seat when the coupling flange is coupled to the floor surface.

In some implementations, the coupling flange includes one or more fasteners or defines one or more fastener openings for coupling the coupling flange to the floor surface.

In some implementations, the base further includes a main portion and an intermediate portion coupled to the seat. In some implementations, the intermediate portion is movable relative to the main portion. In some implementations, the coupling flange extends outwardly from the main portion.

In some implementations, the main portion of the base includes the bottom base surface and the top base surface. In some implementations, the coupling flange extends outwardly at the top side surface.

In some implementations, the seat is movable in a direction having a component vector in a direction parallel to the rotational axis and relative to the base between a raised position and a lowered position.

In some implementations, the base includes a four-bar linkage, wherein the four-bar linkage is movable to cause the seat to move between the raised position and the lowered position.

In some implementations, the system further includes a raising actuator actuatable to cause the seat to move between the raised position and the lowered position. In some implementations, the seat is movable to an intermediate raised position disposed between the raised position and the lowered position. In some implementations, the raising actuator is actuatable to selectively cause the seat to move to the intermediate position.

In some implementations, the main portion includes the four-bar linkage. In some implementations, the four-bar linkage is movable to cause the intermediate portion to move between a raised position and a lowered position. In some implementations, the bottom seat surface is rotationally coupled to the intermediate portion of the base. In some implementations, the intermediate portion of the base includes one or more rails and one or more bearings slidably engaging the one or more rails. In some implementations, the seat is movably coupled to the intermediate portion of the base by the one or more rails and the one or more bearings to cause the seat to move between a fore position and an aft position. In some implementations, the base further includes a pivot hinge coupled to the one or more rails and one or more bearings. In some implementations, the bottom seat surface is rotationally coupled to the base by the pivot hinge.

In some implementations, the main portion includes one or more rails and one or more bearings movably engaging the one or more rails. In some implementations, the one or more bearings are movable relative to the one or more rails to cause the intermediate portion of the base to move between a fore position and an aft position. In some implementations, the bottom seat surface is rotationally coupled to the intermediate portion of the base. In some implementations, the intermediate portion includes the four-bar linkage.

In some implementations, the base further includes a pivot hinge coupled to the four-bar linkage. In some implementations, the bottom seat surface is rotationally coupled to the base by the pivot hinge.

In some implementations, one of the base or the seat includes a thrust bearing. In some implementations, an other of the seat or the base contacts the thrust bearing. In some implementations, the thrust bearing comprises a plain bearing.

In some implementations, the base includes a top base side and a bottom base side opposite and spaced apart from the top base side. In some implementations, the seat is closer to the top base side than it is to the bottom base side. In some implementations, one of the top base side or the bottom seat surface includes the thrust bearing. In some implementations, an other of the bottom seat surface or the top base side contacts the thrust bearing. In some implementations, the top base side includes the thrust bearing.

In some implementations, the thrust bearing is arcuate. In some implementations, the thrust bearing is circular.

In some implementations, the thrust bearing comprises a self-lubricating material. In some implementations, the thrust bearing comprises an acetal bearing.

In some implementations, the base further includes a main portion and an intermediate portion coupled to the seat. In some implementations, the intermediate portion is movable relative to the main portion. In some implementations, the intermediate portion includes the thrust bearing. In some implementations, the seat is movable in a direction having a component vector in a direction parallel to the rotational axis and relative to the base between a raised position and a lowered position.

In some implementations, the base includes a four-bar linkage, wherein the four-bar linkage is movable to cause the seat to move between the raised position and the lowered position.

In some implementations, the system further includes a raising actuator actuatable to cause the seat to move between the raised position and the lowered position. In some implementations, the seat is movable to an intermediate raised position disposed between the raised position and the lowered position. In some implementations, the raising actuator is actuatable to selectively cause the seat to move to the intermediate position.

In some implementations, the main portion includes the four-bar linkage. In some implementations, the four-bar linkage is movable to cause the intermediate portion to move between a raised position and a lowered position. in some implementations, the bottom seat surface is rotationally coupled to the intermediate portion of the base. In some implementations, the intermediate portion of the base includes one or more rails and one or more bearings slidably engaging the one or more rails. In some implementations, the seat is movably coupled to the intermediate portion of the base by the one or more rails and the one or more bearings to cause the seat to move between a fore position and an aft position. In some implementations, the base further includes a pivot hinge coupled to the one or more rails and one or more bearings. In some implementations, the bottom seat surface is rotationally coupled to the base by the pivot hinge.

In some implementations, the main portion includes one or more rails and one or more bearings movably engaging the one or more rails. In some implementations, the one or more bearings are movable relative to the one or more rails to cause the intermediate portion of the base to move between a fore position and an aft position. In some implementations, the bottom seat surface is rotationally coupled to the intermediate portion of the base. In some implementations, the intermediate portion includes the four-bar linkage.

In some implementations, the base further includes a pivot hinge coupled to the four-bar linkage. In some implementations, the bottom seat surface is rotationally coupled to the base by the pivot hinge.

In some implementations, the locking mechanism further includes two or more positional detents and a locking protrusion. In some implementations, the locking mechanism is in the locked position when the locking protrusion is disposed in one of the two or more positional detents and the locking mechanism is in the unlocked position when the locking protrusion is disposed outside of the two or more positional detents. In some implementations, the locking mechanism further includes a handle for moving the locking protrusion into and out of the two or more positional detents. In some implementations, the locking protrusion includes a pin.

In some implementations, the seat further includes a first cleat protrusion extending from the bottom seat surface and a second cleat projection extending from the bottom seat surface. In some implementations, the base further defines a first cleat opening for engaging the first cleat protrusion and a second cleat opening for engaging the second cleat protrusion. In some implementations, the engagement of the first cleat protrusion with the first cleat opening and the engagement of the second cleat protrusion with the second cleat opening pulls the seat closer to the base.

In some implementations, the second cleat opening can be engaged with the second cleat protrusion before the first cleat opening engages the first cleat protrusion. In some implementations, the second cleat protrusion has a first portion extending away from the bottom seat surface and a second portion extending away from a distal end of the first portion of the second cleat protrusion. In some implementations, the first cleat protrusion has a first portion extending away from the bottom seat surface and a second portion extending away from a distal end of the first portion of the first cleat protrusion. In some implementations, the second portion of the first cleat protrusion is shorter than the second portion of the second cleat protrusion.

In some implementations, the first cleat protrusion has a first portion extending away from the bottom seat surface and a second portion extending away from a distal end of the first portion of the first cleat protrusion. In some implementations, the second portion of the first cleat protrusion includes an inclined surface relative to the bottom seat surface and the first cleat opening has a complementary inclined surface such that, the engagement of the inclined surface of the second portion of the first cleat protrusion with the inclined surface of the first cleat opening causes the seat to be pulled closer to the base.

In some implementations, the second cleat protrusion has a first portion extending away from the bottom seat surface and a second portion extending away from a distal end of the first portion of the second cleat protrusion. In some implementations, the first cleat protrusion has a first portion extending away from the bottom seat surface and a second portion extending away from a distal end of the first portion of the first cleat protrusion. In some implementations, the second portion of the first cleat protrusion extends in the same direction as the second portion of the second cleat protrusion.

In some implementations, the first cleat protrusion is located adjacent the first seat end and the second cleat projection is located adjacent the second seat end.

In some implementations, the seat is movable in a direction having a component vector in a direction parallel to the rotational axis and relative to the base between a raised position and a lowered position. In some implementations, the seat is movable in a direction having a component vector in a direction parallel to the rotational axis and relative to the base between a raised position and a lowered position.

In some implementations, the base includes a four-bar linkage. In some implementations, the four-bar linkage is movable to cause the seat to move between the raised position and the lowered position.

In some implementations, the system further includes a raising actuator actuatable to cause the seat to move between the raised position and the lowered position. In some implementations, the seat is movable to an intermediate raised position disposed between the raised position and the lowered position. In some implementations, the raising actuator is actuatable to selectively cause the seat to move to the intermediate position.

In some implementations, the main portion includes the four-bar linkage. In some implementations, the four-bar linkage is movable to cause the intermediate portion to move between a raised position and a lowered position. In some implementations, the bottom seat surface is rotationally coupled to the intermediate portion of the base. In some implementations, the intermediate portion of the base includes one or more rails and one or more bearings slidably engaging the one or more rails. In some implementations, the seat is movably coupled to the intermediate portion of the base by the one or more rails and the one or more bearings to cause the seat to move between a fore position and an aft position. In some implementations, the base further includes a pivot hinge coupled to the one or more rails and one or more bearings. In some implementations, the bottom seat surface is rotationally coupled to the base by the pivot hinge.

In some implementations, the main portion includes one or more rails and one or more bearings movably engaging the one or more rails. In some implementations, the one or more bearings are movable relative to the one or more rails to cause the intermediate portion of the base to move between a fore position and an aft position. In some implementations, the bottom seat surface is rotationally coupled to the intermediate portion of the base. In some implementations, the intermediate portion includes the four-bar linkage.

In some implementations, the base further includes a pivot hinge coupled to the four-bar linkage. In some implementations, the bottom seat surface is rotationally coupled to the base by the pivot hinge.

Various other implementations include a seat system. The system includes a base and a seat. The seat includes a bottom seat surface rotationally coupled to the base such that the seat is rotatable about a seat rotational axis between a first rotational position and a second rotational position. One of the base or the seat includes a plain thrust bearing. In some implementations, an other of the seat or the base contacts the plain thrust bearing.

In some implementations, the base includes a top base side and a bottom base side opposite and spaced apart from the top base side. In some implementations, the seat is closer to the top base side than it is to the bottom base side. In some implementations, one of the top base side or the bottom seat surface includes the thrust bearing. In some implementations, an other of the bottom seat surface or the top base side contacts the thrust bearing.

In some implementations, the top base side includes the thrust bearing.

In some implementations, the thrust bearing is arcuate. In some implementations, the thrust bearing is circular.

In some implementations, the thrust bearing includes a self-lubricating material. In some implementations, the thrust bearing includes an acetal bearing.

Various other implementations include a seat attachment system. The system includes a base and a seat. The base defines a first cleat opening for engaging the first cleat protrusion and a second cleat opening for engaging the second cleat protrusion. The seat includes a bottom seat surface rotationally coupled to the base such that the seat is rotatable about a seat rotational axis between a first rotational position and a second rotational position. A first cleat protrusion extends from the bottom seat surface and a second cleat projection extends from the bottom seat surface. The engagement of the first cleat protrusion with the first cleat opening and the engagement of the second cleat protrusion with the second cleat opening pulls the seat closer to the base.

In some implementations, the second cleat opening can be engaged with the second cleat protrusion before the first cleat opening engages the first cleat protrusion. In some implementations, the second cleat protrusion has a first portion extending away from the bottom seat surface and a second portion extending away from a distal end of the first portion of the second cleat protrusion. In some implementations, the first cleat protrusion has a first portion extending away from the bottom seat surface and a second portion extending away from a distal end of the first portion of the first cleat protrusion. In some implementations, the second portion of the first cleat protrusion is shorter than the second portion of the second cleat protrusion.

In some implementations, the first cleat protrusion has a first portion extending away from the bottom seat surface and a second portion extending away from a distal end of the first portion of the first cleat protrusion. In some implementations, the second portion of the first cleat protrusion includes an inclined surface relative to the bottom seat surface and the first cleat opening has a complementary inclined surface such that, the engagement of the inclined surface of the second portion of the first cleat protrusion with the inclined surface of the first cleat opening causes the seat to be pulled closer to the base.

In some implementations, the second cleat protrusion has a first portion extending away from the bottom seat surface and a second portion extending away from a distal end of the first portion of the second cleat protrusion. In some implementations, the first cleat protrusion has a first portion extending away from the bottom seat surface and a second portion extending away from a distal end of the first portion of the first cleat protrusion. In some implementations, the second portion of the first cleat protrusion extends in the same direction as the second portion of the second cleat protrusion.

In some implementations, the seat further includes a first seat end and a second seat end opposite and spaced apart from the first seat end. In some implementations, the first cleat protrusion is located adjacent the first seat end and the second cleat projection is located adjacent the second seat end.

BRIEF DESCRIPTION OF DRAWINGS

Example features and implementations of the present disclosure are disclosed in the accompanying drawings. However, the present disclosure is not limited to the precise arrangements and instrumentalities shown. Similar elements in different implementations are designated using the same reference numerals.

FIG. 1A is a side view of a base of a seat riser system in a lowered position, according to one implementation.

FIG. 1B is a side view of the base of the seat riser system of FIG. 1A in a raised position.

FIG. 2A is a side view of the base of the seat riser system of FIG. 1A in a fore position.

FIG. 2B is a side view of the base of the seat riser system of FIG. 1A in an aft position.

FIG. 7A is a top view of the base, pivot hinge, and locking mechanism of the seat riser system of FIG. 1A.

FIG. 7B is a cross-sectional view of the base, pivot hinge, and locking mechanism of the seat riser system of FIG. 1A along line C-C.

FIG. 8A is a top view of the main portion of the base of a seat riser system, according to another implementation.

FIG. 8B is a side view of the main portion of the base of the seat riser system of FIG. 8A.

FIG. 8C is an end view of the main portion of the base of the seat riser system of FIG. 8A.

FIG. 9B is a top view of a seat coupled to the base of the seat riser system of FIG. 9A.

FIG. 9C is a cross-sectional view of the seat riser system of FIG. 9B along line 9C-9C.

FIG. 11C is a detail view of the second cleat opening and the second cleat protrusion of FIG. 11B.

FIG. 11D is a detail view of the first cleat opening and the first cleat protrusion of FIG. 11B.

FIG. 11E is a detail view of the second cleat opening of FIG. 11B.

FIG. 11F is a detail view of the first cleat opening of FIG. 11B.

FIG. 11G is a detail view of the second cleat protrusion of FIG. 11B.

FIG. 11H is a detail view of the first cleat protrusion of FIG. 11B.

DETAILED DESCRIPTION

Figure 3:
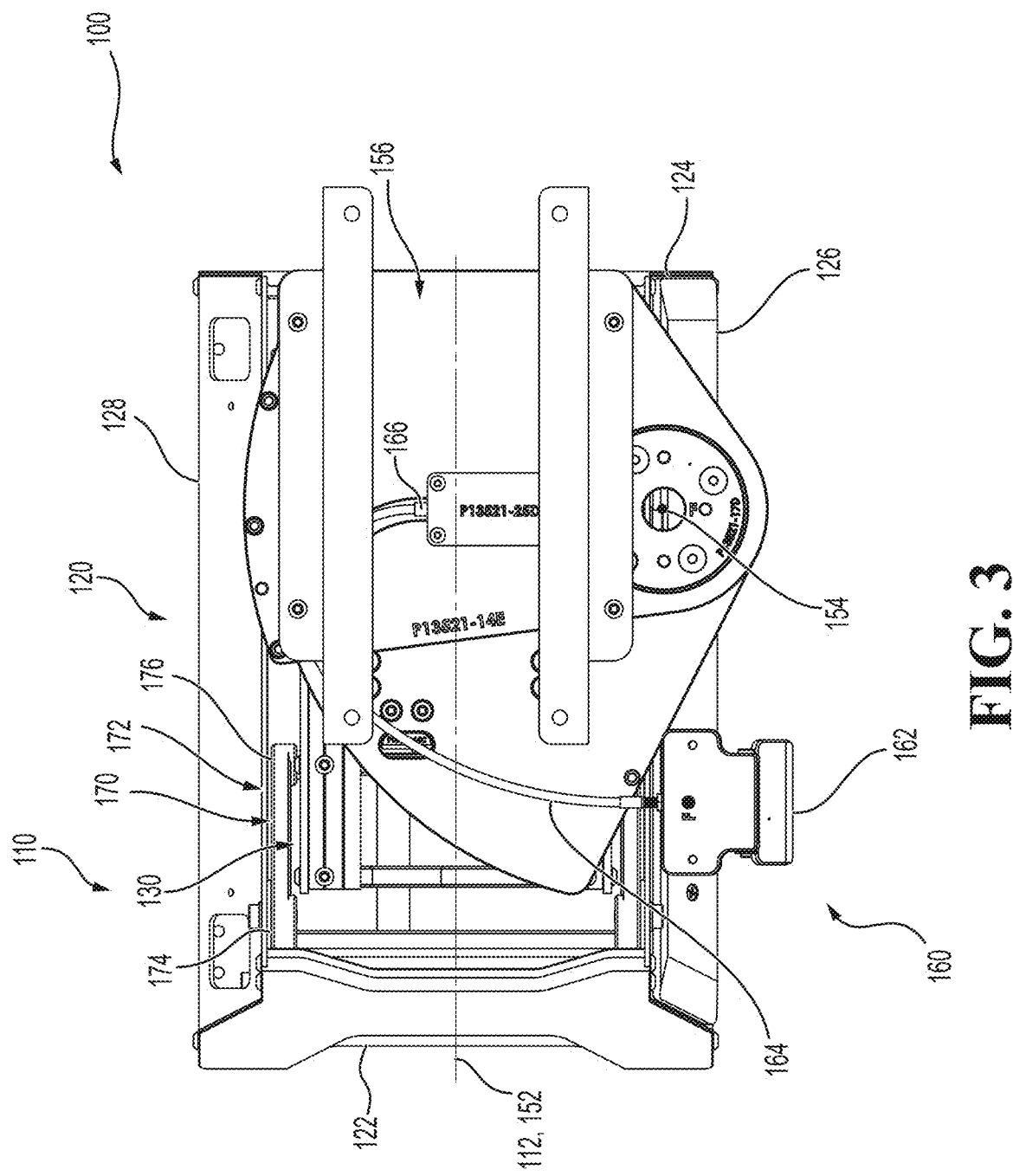
FIG. 3 is a top view of the base of the seat riser system of FIG. 1A.
Figure 4A:
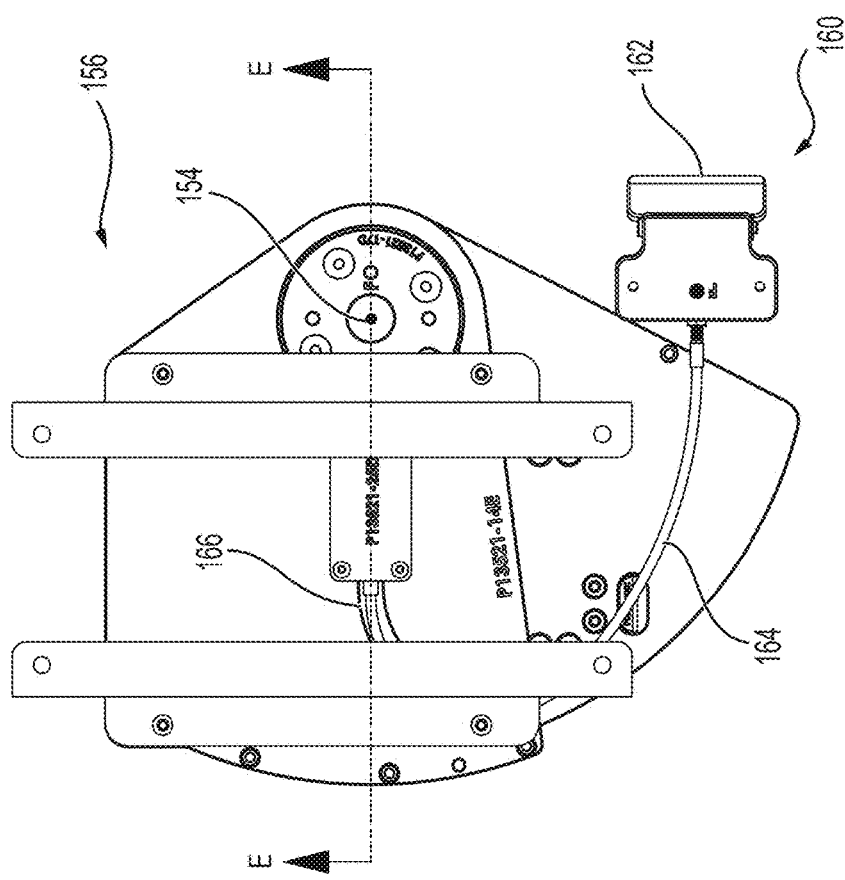
FIG. 4A is a top view of the pivot hinge and locking mechanism of the seat riser system of FIG. 1A.
Figure 4B:
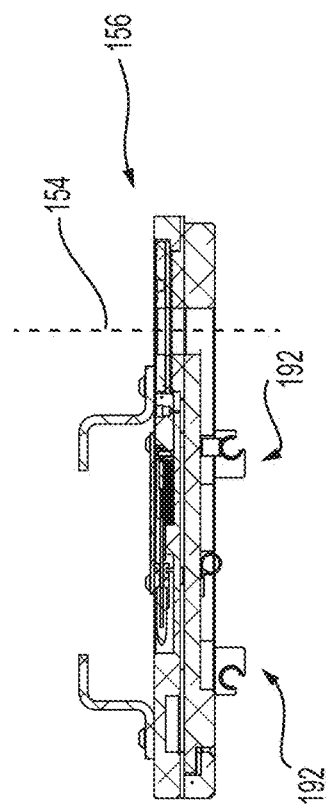
FIG. 4B is a cross-sectional view of the pivot hinge and locking mechanism of the seat riser system of FIG. 1A along line E-E.
Figure 5:
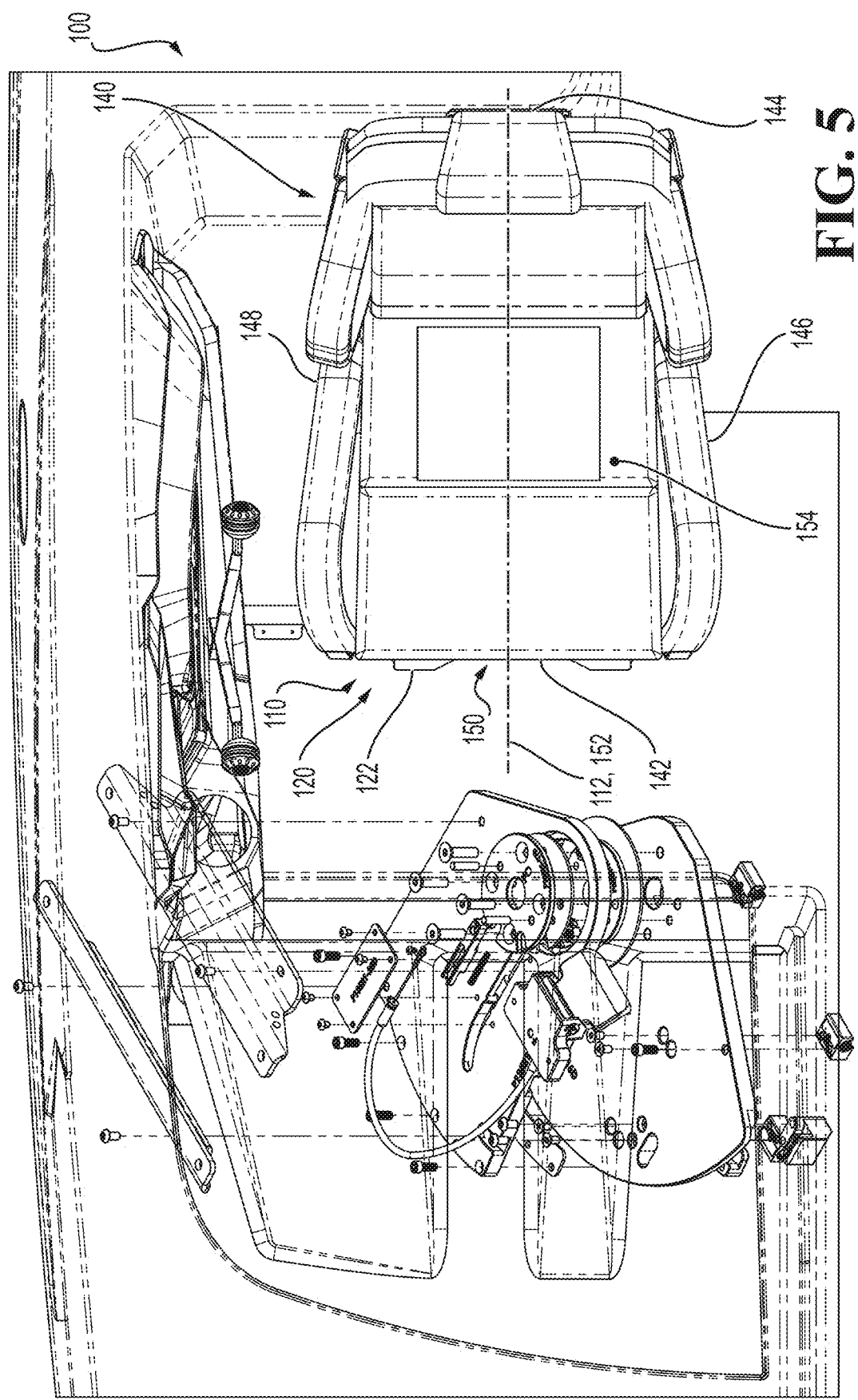
FIG. 5 is a top view of the seat riser system of FIG. 1A in a first rotational position.

The devices, systems, and methods disclosed herein provide for a seat of a watercraft that does not collide with other features of the watercraft, such as the shifter panel and other panels, when the seat is rotated. Specifically, the seats and systems disclosed herein include a rotational axis that is off-center from the center line of the seat such that the seat pivots about an arc instead of in place, as many traditional seats do. The sweeping arcuate path of the seat rotation prevents the corners of the seat from extending further than necessary from the footprint of the seat in its fore-facing position. This allows the seat to rotate without colliding with the shifter panel and other panels of the watercraft.

The seats and systems disclosed herein further include mechanisms to provide for raising/lowering and fore/aft movement of the seat.

Various implementations include a seat riser system. The system includes a base and a seat. The base has a base center line, first base end, a second base end opposite and spaced apart from the first base end along the base center line, a first base side extending between the first base end and the second base end, and a second base side opposite and spaced apart from the first base side. The seat has a seat center line, a first seat end, a second seat end opposite and spaced apart from the first seat end along the seat center line, a first seat side extending between the first seat end and the second seat end, a second seat side opposite and spaced apart from the first seat side, and a bottom seat surface rotationally coupled to the base such that the seat is rotatable about a seat rotational axis between a first rotational position and a second rotational position. The seat rotational axis is spaced apart from the seat center line such that the seat rotational axis is closer to the first seat side than it is to the second seat side.

FIGS. 1A-7B show a seat riser system 100 having aspects of various implementations. The system 100 is intended to be coupled to a watercraft, such as a boat, to provide users of the watercraft with a seat during use of the watercraft. The system 100 includes a base 110 and a seat 140.

The base 110 includes a main portion 120 and an intermediate portion 130. The main portion 120 of the base 110 has a base center line 112, first base end 122, and a second base 124 end opposite and spaced apart from the first base end 122 along the base center line 112. The base center line 112 is intended to extend parallel to a surge axis of the watercraft to which it is coupled. However, it is understood that the system 100 can be coupled in any desired location or orientation on a watercraft, any other vehicle, or any stationary setting.

The main portion 120 of the base 110 further has a first base side 126 extending between the first base end 122 and the second base end 124 and a second base side 128 opposite and spaced apart from the first base side 126. The main portion 120 of the base 110 is intended to be coupled to the deck of a watercraft, and the intermediate portion 130 of the base 110 is movably coupled to the main portion 120 of the base 110.

The seat 140 has a seat center line 152, a first seat end 142, a second seat end 144 opposite and spaced apart from the first seat end 142 along the seat center line 152, a first seat side 146 extending between the first seat end 142 and the second seat end 144, a second seat side 148 opposite and spaced apart from the first seat side 146, and a bottom seat surface 150. The bottom seat surface 150 is rotationally coupled to the intermediate portion 130 of the base 110 such that the seat 140 is rotatable about a seat rotational axis 154 between a first rotational position (shown in FIG. 5) and a second rotational position (shown in FIG. 6).

The bottom seat surface 150) is rotationally coupled to the intermediate portion 130 by a pivot hinge 156 which defines the seat rotational axis 154. The pivot hinge 156 is disposed such that the seat rotational axis 154 is spaced apart from the seat center line 152 and is closer to the first seat side 146 than it is to the second seat side 148. Because the seat rotational axis 154 is offset from the seat center line 152, rotation of the seat 140 about the seat rotational axis 154 results in the seat 140 moving along an arcuate path with a sweeping curvature rather than the simple pivot motion of a traditional seat that has its axis of rotation at its center line. As a result, the corners of the seat 140 are less likely than traditional seats to collide with nearby panels, controls or any other features located adjacent the second seat side during rotation.

Furthermore, the seat rotational axis 154 is spaced apart from the base center line 112 such that the seat rotational axis 154 is closer to the first base side 126 than it is to the second base side 128. This offset allows the seat center line 154 to be positionable over the base center line 112, or closer thereto, such that the base 110 is positioned beneath the seat 140, similar to a traditional seat.

Figure 10:
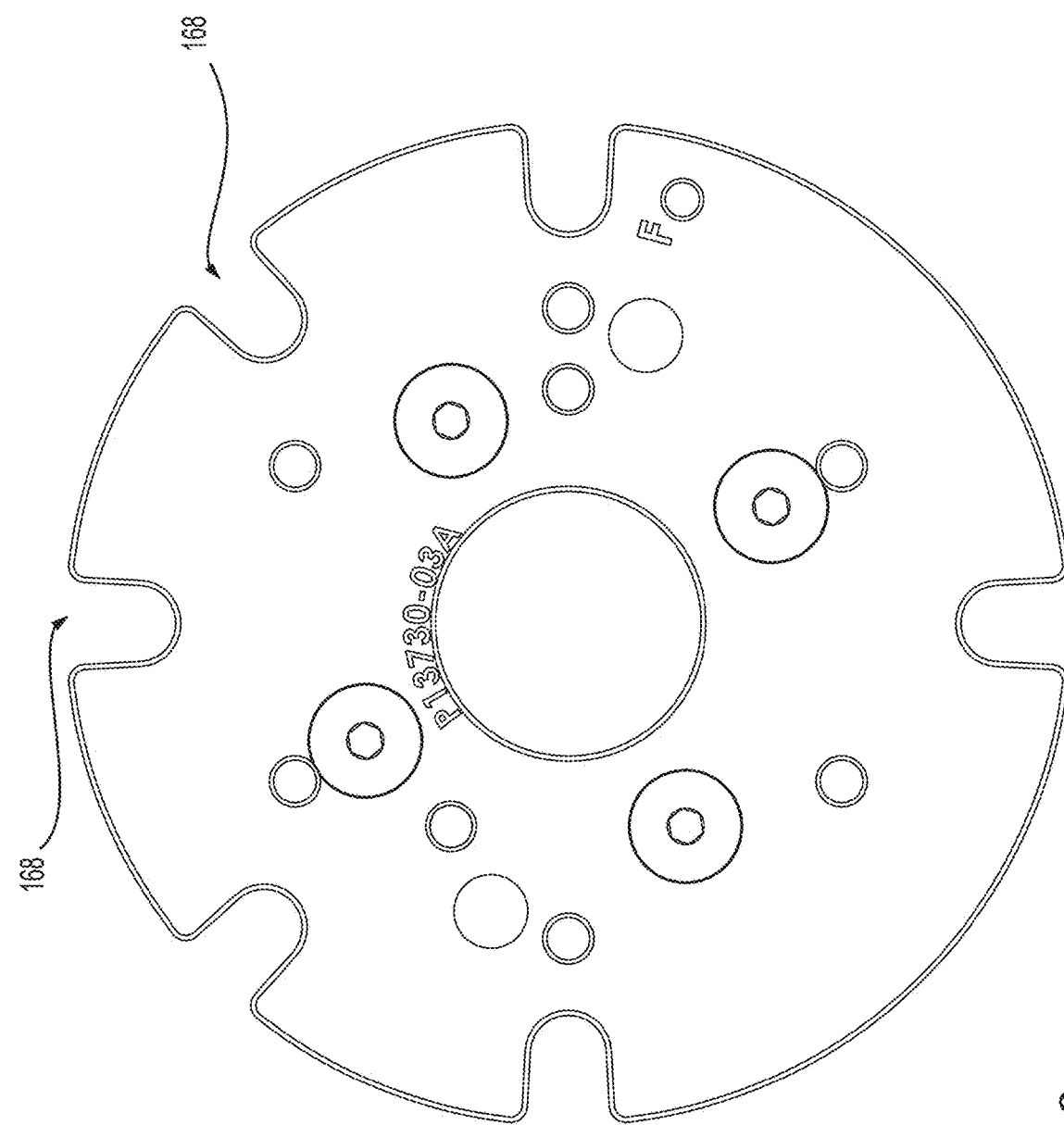
FIG. 10 is a portion of the seat of FIG. 1A including positioning detents.
Figure 11A:
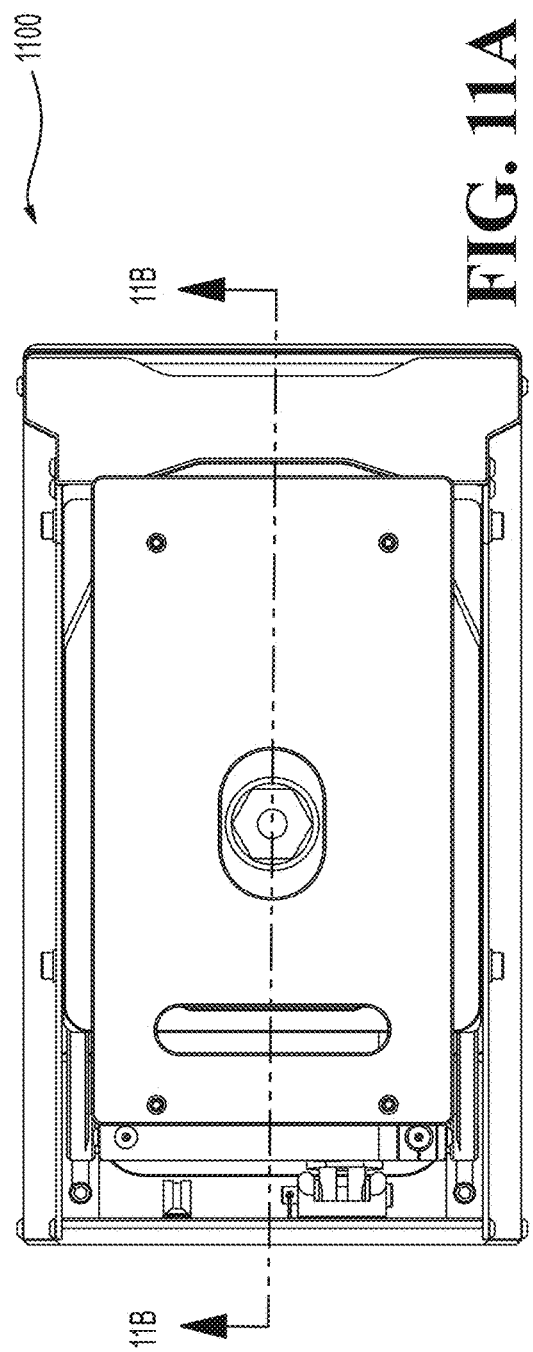
FIG. 11A is a top view of a seat riser system, according to another implementation.
Figure 11B:
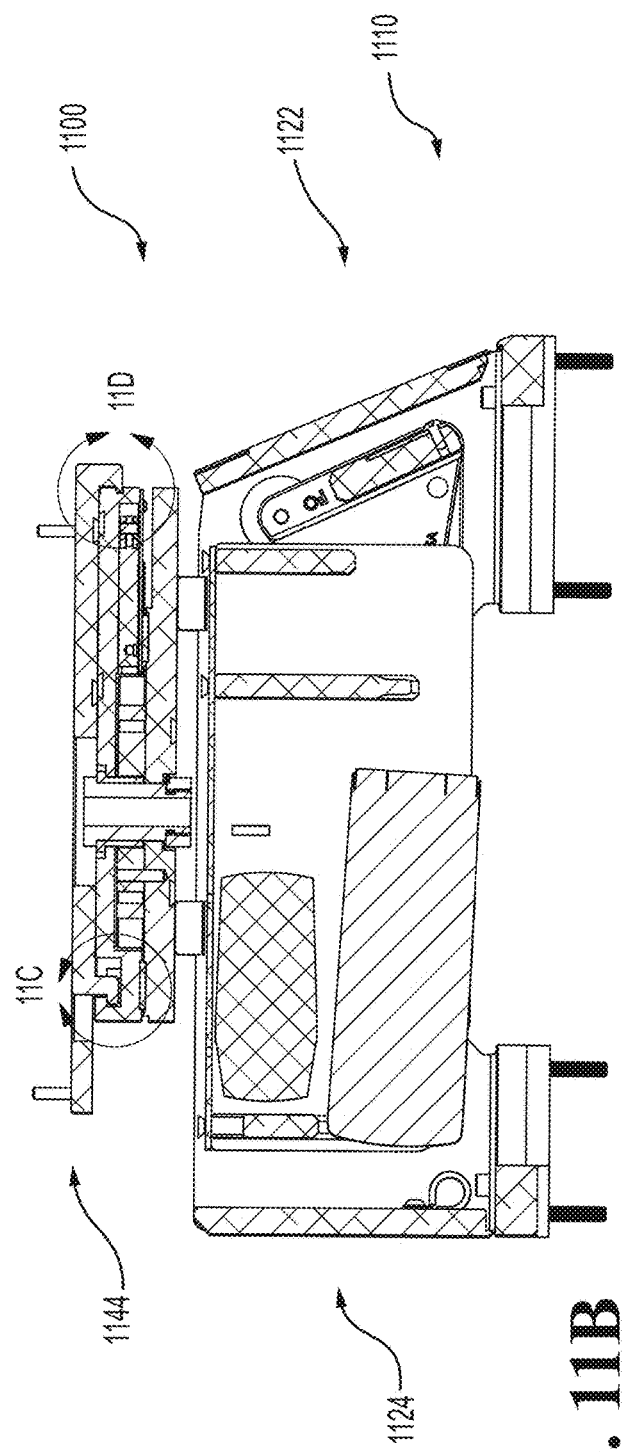
FIG. 11B is a cross-sectional view of the seat riser system of FIG. 11A along line 11B-11B.

The system 100 shown in FIGS. 1A-7B further includes a locking mechanism 160 for locking the seat 140 in a desired position. The locking mechanism 160 includes a handle 162, a cable 164, and a pin 166. The locking mechanism 160 is movable between a locked position and an unlocked position by actuating the handle 162. As the handle 162 moves, the cable 164 coupled to the handle 162 is pulled, which in turn pulls the pin 166 from one of two or more positional detents 168 defined by a portion of the seat 140. FIG. 10 shows an example of a portion of the seat 140 including six positional detents 168. As the seat 140 rotates, a different one of the six positional detents is alignable with the pin 166 or other locking protrusion to such that the pin 166 or other locking protrusion can be inserted into positional detent 168.

Figure 6:
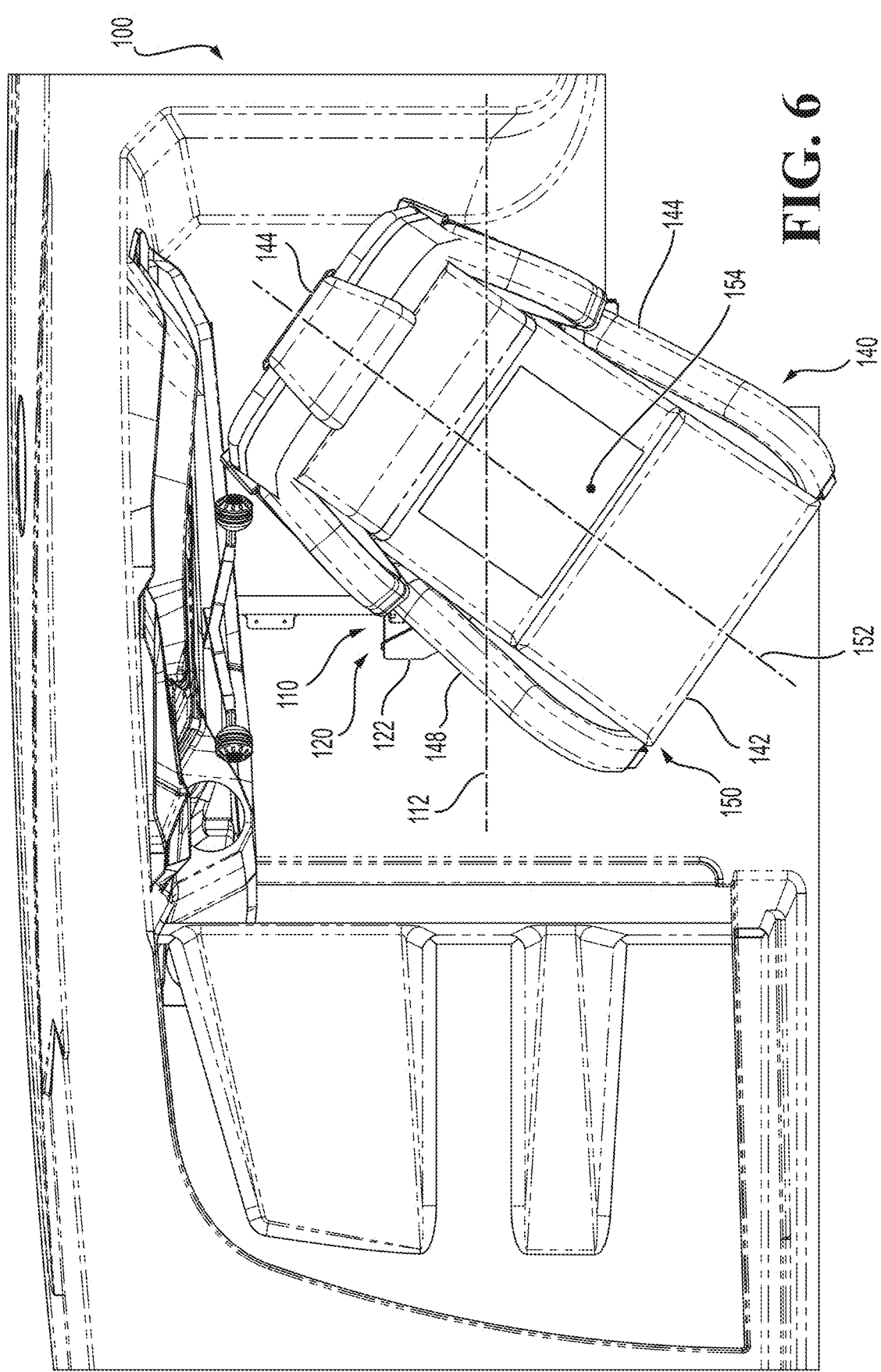
FIG. 6 is a top view of the seat riser system of FIG. 1A in a second rotational position.

With the pin 166 or other locking protrusion removed from the positional detent 168 in the unlocked position, the seat 140 is allowed to rotate between the first rotational position (shown in FIG. 5) and the second rotational position (shown in FIG. 6). The handle 162 is biased toward the locked position by a spring force such that, when the actuation force on the handle 162 is released, the handle 162 moves back to the locked position and the pin 166 is reinserted into the positional detent 168, preventing the seat 140 from rotating between the first rotational position and the second rotational position in the locked position. Although the locking mechanism 160 shown in FIGS. 1A-7B includes a handle 162, a cable 164, and a pin 166, in some implementations, the seat includes any other type of rotational locking mechanism known in the art. In some implementations, the seat does not include a locking mechanism.

In some implementations, the seat includes a rotation actuator that is actuatable to cause the seat to rotate about the seat rotational axis between the first rotational position and the second rotational position. In some implementations, the rotation actuator has a memory setting such that the seat is rotatable to a third rotational position disposed rotationally between the first rotational position and the second rotational position, and the rotation actuator is actuatable to selectively cause the seat to rotate about the seat rotational axis to the third rotational position.

The system 100 is also configured to allow movement of the seat 140 upwardly and downwardly. The main portion 120 of the base 110 includes two, four-bar linkages 170 movably coupling the main portion 120 of the base 110 to the intermediate portion 130 of the base 110. Each of the two four-bar linkages 170 includes a primary linkage 172 and a secondary linkage 182. A first four-bar linkage 170 is disposed along the first base side 126, and a second four-bar linkage 170 is disposed along the second base side 128.

A first end 174 of each of the primary linkages 172 of the first and second four-bar linkages 170 are rotatably coupled to a fore portion of the respective sides of the main portion 120 of the base 110, and a second end 176 of the primary linkages 172 of the first and second four-bar linkages 170 are rotatably coupled to a fore portion of the respective sides of the intermediate portion 130 of the base 110. Similarly, a first end 184 of the secondary linkages 182 of the first and second four-bar linkages 170 are rotatably coupled to an aft portion of the respective sides of the main portion 120 of the base 110, and a second end 186 of the secondary linkages 182 of the first and second four-bar linkages 170 are rotatably coupled to an aft portion of the respective sides of the intermediate portion 130 of the base 110.

The base 110 includes a raising actuator 188 that is coupled to the main portion 120 of the base 110 and to the primary linkage 172 of the first four-bar linkage 170. The raising actuator 188 is actuatable to cause rotation of the primary linkage 172 of the first four-bar linkage 170, which drives the other three passive linkages 172, 182 of the four-bar linkages 170.

As the four-bar linkages 170 are rotated, the intermediate portion 130 of the base 110 moves between a raised position (shown in FIG. 1B) and a lowered position (shown in FIG. 1A). The seat 140 of the system 110 is distantly coupled to the intermediate portion 130 such that movement of the intermediate portion 130 of the base 110 between the raised position and the lowered position also moves the seat 140 between the raised position and the lowered position. Because the intermediate portion 130 is moved by the rotation of the four-bar linkages 170, the intermediate portion 130 moves relative to the main portion 120 of the base 110 along a curved path in a direction having a component vector in a direction parallel to the rotational axis 154 of the seat 140).

In some implementations, the raising actuator has a memory setting such that the seat is movable to an intermediate raised position disposed between the raised position and the lowered position, and the raising actuator is actuatable to selectively cause the seat to move to the intermediate raised position.

Although the raising mechanism shown in FIGS. 1A-7B includes two, four-bar linkages 170, in some implementations, the system includes any other type of raising mechanism known in the art. In some implementations, the system does not include a raising mechanism.

The system 100 is also configured to allow movement of the seat 140 parallel to the base center line 112 and relative to the base 110 between a fore position and an aft position. The intermediate portion 130 of the base 110 includes two rails 190 and two bearings 192. One of the bearings 192 slidably engages a first rail 190, and the other bearing 192 slidingly engages a second rail 190. The pivot hinge 156 is coupled to the bearings 192, which movably couples the seat 140 to the intermediate portion 130 of the base 110 to cause the seat 140 to move between the fore position (shown in FIG. 2A) and the aft position (shown in FIG. 2B). Although the system 100 shown in FIGS. 1A-7B include two rails 190 and two bearings 192, in some implementations, the system includes any number of one or more rails and any number of one or more bearings. Although the system 100 shown in FIGS. 1A-7B includes the rails 190 on the intermediate portion 130 of the base 110 and the bearings 192 are coupled to the pivot hinge 156 of the seat 140, in some implementations, the bearings are coupled to the intermediate portion of the base and the rails are coupled to the pivot hinge of the seat. In some implementations, the system includes any other type of sliding mechanism known in the art. In some implementations, the system does not include a sliding mechanism.

The system 100 includes a fore actuator 198 that is actuatable to cause the seat 140 to move between the fore position and the aft position. The fore actuator 198 can be coupled to any one of the bearings 192 or to the seat 140 itself.

In some implementations, the fore actuator has a memory setting such that the seat is movable to an intermediate fore position disposed between the fore position and the after position, and the fore actuator is actuatable to selectively cause the seat to move to the intermediate fore position.

Although the system 100 shown in FIGS. 1A-7B includes the raising mechanism in the main portion 120 of the base 110 to lift the intermediate portion 130 of the base 110, the sliding mechanism coupled to the intermediate portion 130 of the base 110, and the pivot hinge 156 of the seat 140 coupled to the sliding mechanism, in some implementations, the system includes one or more rails and one or more bearings in the main portion of the base for moving the intermediate portion of the base. In these implementations, the four-bar linkage is coupled to the intermediate portion of the base such that the four-bar linkage moves fore and aft with the intermediate portion. The pivot hinge is coupled to the four-bar linkage, and the seat is coupled to the pivot hinge.

In some implementations, the system 800 includes a low-profile base 810 that is able to be recessed into an opening in the deck of a watercraft. The base 810 includes a flange 832 spaced apart from the bottom base surface 836 of the base 810, allowing a portion of the base 810 to be disposed within the opening in the deck with the flange 832 resting on the top surface of the deck. This implementation can be useful for watercraft in which a pedestal of the deck is located under a seat and the layered components of the seats described herein could introduce clearance issues. By recessing at least a portion of the base 810 within the deck, the effective combined height of the seats described herein can be reduced. Although the low-profile base 810 features can be used with the offset seat rotational axis configurations disclosed herein, in some implementations, the low-profile base features can be used in combination with a seat rotational axis that is centrally located with the base central line. In some implementations, the low-profile features can be used in combination with a non-rotational seat.

The main portion 820 of a low-profile base 810 is shown in FIGS. 8A-8C. The main portion 820 of the base 810 is movably couplable to an intermediate portion and a seat is couplable to the intermediate portion, as described above.

The main portion 820 has a top base side 834 and a bottom base side 836 opposite and spaced apart from the top base side 834 that is closer to the seat than the top base side 834 in use. As noted, the base 810 includes a coupling flange 832 extending outwardly along the top side surface 834 from each of the first base end 822, the second base end 824, the first base side 826, and the second base side 828. However, in some implementations, the coupling flange extends from at least two of the first base end, the second base end, the first base side, or the second base side. In some implementations, the coupling flange extends from at least one of the first base end, the second base end, the first base side, or the second base side. In some implementations, the coupling flange extends from any portion of the base between the top side surface and the bottom side surface.

In use, the bottom side surface 836 of the base 810 is disposed within an opening in the deck such that the coupling flange 832 is disposed on the same side of the floor surface as the seat. This allows at least a portion of the base 810 to be recessed within the deck.

The coupling flange 832 includes sixteen internally threaded rods 838 extending from a bottom surface of the coupling flange 832 toward the bottom side surface 836 of the base 810. The end of each of the internally threaded rods 838 opposite the coupling flange 832 defines a threaded opening for receiving a threaded fastener. The internally threaded rods 838 are each configured to extend through a separate fastener opening in the deck of the watercraft such that the threaded opening is disposed below the deck. Fasteners are then engaged with the threaded openings of the internally threaded rods 838 to couple the base 810 to the deck of the watercraft.

In some implementations, the coupling flange includes externally threaded rods instead of or in addition to the internally threaded rods and are configured to extend through the openings in the deck. Nuts or other device defining internally threaded openings is then engageable with the external threads of the rods to couple the base to the deck. In some implementations, the coupling flange defines one or more fastener openings extending through the coupling flange. A separate fastener can be inserted through each of the one or more fastener openings and an aligned opening in the deck. A nut or other device is then engageable with the fastener to couple the base to the deck.

Figure 9A:
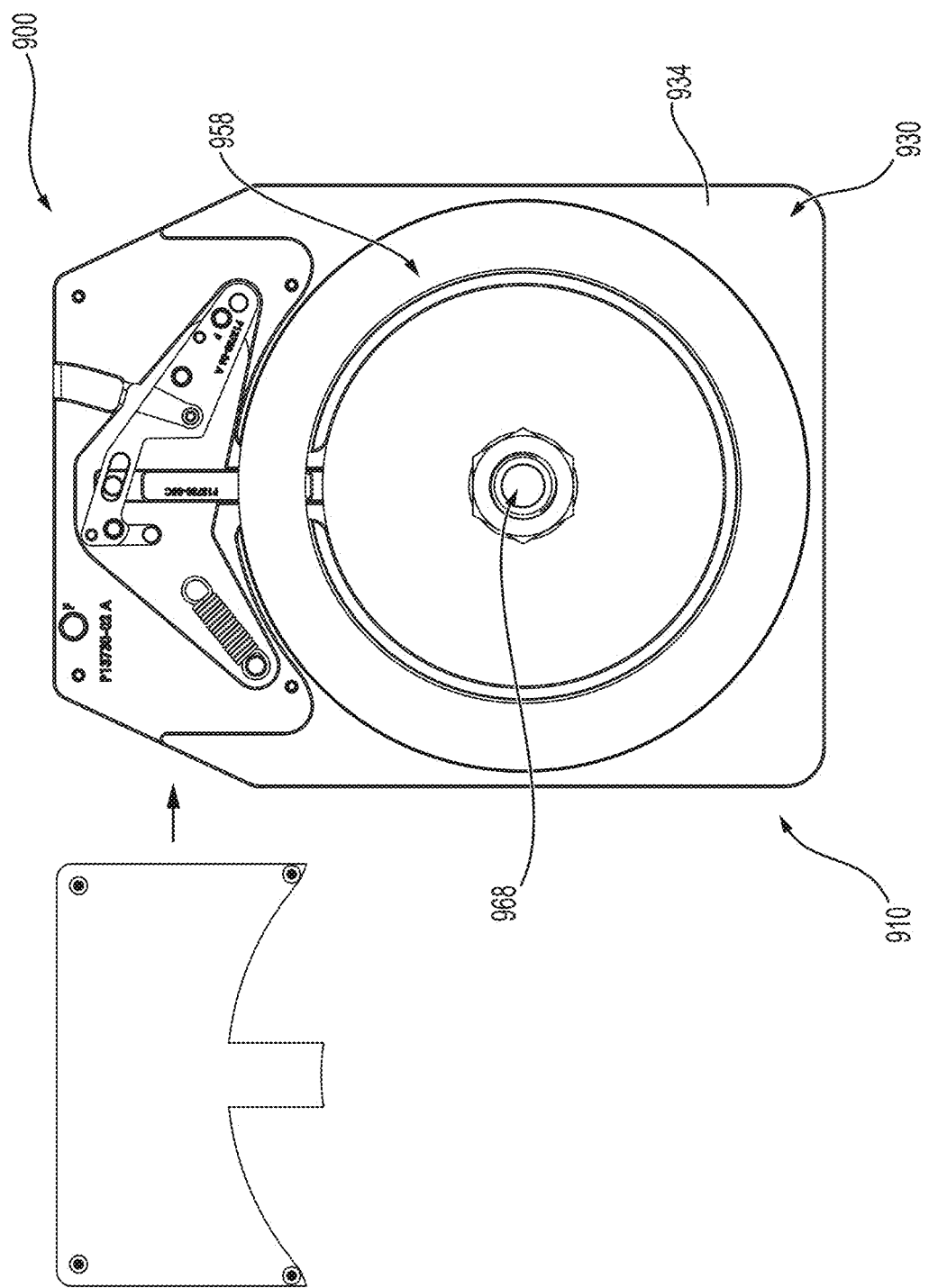
FIG. 9A is a top view of a base of a seat riser system, according to another implementation.

Some implementations include a system 900 including a portion of the base 910 or seat 940 that includes a thrust bearing 958 on which the seat 940 rotates. For example, FIGS. 9A-9C show an implementation in which a top base side 934 of the intermediate portion 930 of the base 910 includes a plain thrust bearing 958. The bearing 958 shown in FIGS. 9A-9C is circular, but in some implementations, the bearing is only arcuately shaped and does not form a full circle. In some implementations, the bearing is any other shape that contacts the bottom seat surface to allow the seat to rotate relative to the base.

As noted above, the thrust bearing 958 shown in FIGS. 9A-9C is a plain thrust bearing (i.e., a sliding contact bearing or a slide bearing) with no moving parts. The bearing 958 is an acetal bearing, which has a low coefficient of friction and is a self-lubricating material. However, in some implementations, the thrust bearing is made of any other material capable of facilitating the rotation of the seat relative to the base. In some implementations, the material is any low-friction material. In some implementations, the material is any self-lubricating material. In some implementations, the thrust bearing is a ball bearing type thrust bearing.

In some implementations, the seat 940 and the base 910 are coupled to each other by a hollow shaft 968. The hollow shaft 968 shown in FIGS. 9A-9C rotationally couples the seat 940 to the base 910. Because the hollow shaft 968 is hollow, cables or a cable track can extend from the base 910) to the seat 940 without being seen. The seat 940 can rotate relative to the base 910 without the cables or cable track interfering with the rotation. The location of the cables or cable track within the hollow shaft 968 also protects the cables or cable track from being damaged by the base 910, the seat 940, or any other moving parts of the system 900 during use.

In some implementations, the system 1100 has a base 1110 that includes one or more cleat openings 1170A, 1170B and the seat 1140 includes one or more cleat protrusions 1180A, 1180B configured to engage the cleat openings 1170A, 1170B. The cleat protrusions 1180A, 1180B and the cleat openings 1170A. 1170B are configured such that, when they engage each other, the engagement pulls the seat 1140 toward the base 1110. These features aid the proper positioning and securing of the seat 1140 to the base 1110 during assembly.

The system 1100 of FIGS. 11A-11H shows a base 1110 and a seat 1140 according to one implementation. The base 1110 includes a first cleat opening 1170A adjacent first base end 1122 and a second cleat opening 1170B adjacent the second base end 1124. The second cleat opening 1170B is defined by the top base side 1134. The second cleat opening 1170B has a first portion 1172B extending from the top base side 1134 and a second portion 1174B extending from a distal end of the first portion 1172B of the second cleat opening 1170B. The first portion 1172B of the second cleat opening 1170B extends substantially perpendicular to the top base side 1134, and the second portion 1174B of the second cleat opening 1170B extends substantially perpendicular to a longitudinal axis of the first portion 1172B of the second cleat opening 1170B. However, in some implementations, the first portion can extend at any angle to the top base side, and the second portion can extend at any angle to the longitudinal axis of the first portion.

The first cleat opening 1170A shown in FIGS. 11A-11H is defined by the first base end 1134 itself, but in some implementations, the first base side can be defined by the top base side similar to the second cleat opening. In such implementations, the first cleat opening would include a first portion and a second portion similar to those of the second cleat opening.

The seat 1140 includes a first cleat protrusion 1180A extending from the bottom seat surface 1150) and a second cleat protrusion 1180B extending from the bottom seat surface 1150. Each of the first cleat protrusion 1180A and the second seat protrusion 1180B include a first portion 1182A. 1182B extending substantially perpendicularly from the bottom seat surface 1150) and a second portion 1184A. 1184B extending from a distal end of the first portion 1182A. 1182B of the respective first cleat protrusion 1180A or second cleat protrusion 1180B and substantially perpendicularly to the longitudinal axis of the respective first portion 1182A. 1182B. However, in some implementations, the first portion can extend at any angle to the bottom seat surface, and the second portion can extend at any angle to the longitudinal axis of the first portion.

The second portion 1174B of the second cleat opening 1170B and the only portion of the first cleat opening 1170A both extend toward the seat second end 1144. Similarly, the second portions 1184A. 1184B of both the first cleat protrusion 1180A and the second cleat protrusion 1180B extend toward the second base end 1124. The first cleat protrusion 1180A and the second cleat protrusion 1180B are both located and oriented to be simultaneously engageable with the first cleat opening 1170A and the second cleat opening 1170B, respectively.

The second cleat protrusion 1180B is configured to be inserted into the second cleat opening 1170B, and the first cleat protrusion 1180A is configured to be inserted into the first cleat opening 1170A. When the second cleat protrusion 1180B is inserted into the second cleat opening 1170B, the second portion 1184B of the second cleat protrusion 1180B is engageable with the second portion 1174B of the second cleat opening 1170B by sliding the seat 1140 relative to the base 1110 toward the second base end 1144. The second portion 1184B of the second cleat protrusion 1180B is longer than the second portion 1184A of the first cleat protrusion 1180A. Thus, the second cleat protrusion 1180B can begin engaging the second cleat opening 1170B prior to the first cleat protrusion 1180A engaging the first cleat opening 1170A.

As the seat 1140) continues to move toward the second base end 1124, the second portion 1184A of the first cleat protrusion 1180A engages the first cleat opening 1170A. The second portion 1184A of the first cleat protrusion 1180A includes an inclined surface 1186A that forms an oblique angle relative to the bottom seat surface 1150. The first cleat opening 1170A has a complementary inclined surface 1176A such that, the engagement of the inclined surface 1186A of the second portion 1184A of the first cleat protrusion 1180A with the inclined surface 1176A of the first cleat opening 1170A causes the seat 1140 to be pulled closer to the base 1110 as the first cleat protrusion 1180A engages the first cleat opening 1170A. This engagement aids in quickly locating and tightly securing the seat 1140 to the base 1110.

Once the second cleat protrusion 1180B has engaged the second cleat opening 1170B and the first cleat protrusion 1180A has engaged the first cleat opening 1170A, a locking member 1190 can be inserted into the second cleat opening 1170B to prevent the second portion 1184B of the second cleat protrusion 1180B from disengaging from the second portion 1174B of the second cleat opening 1170B. Thus, the locking member 1190 prevents the seat 1140 from disengaging with the base 1110.

In some implementations, bolts or other fasteners can then be used to fasten the seat 1140 to the base 1110 and to pull the second portion 1184A of the first cleat protrusion 1180A into the first cleat opening 1170A more tightly to better secure the seat 1140 to the base 1110.

A number of example implementations are provided herein. However, it is understood that various modifications can be made without departing from the spirit and scope of the disclosure herein. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device are disclosed herein, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

What is claimed is:

1. A seat riser system, the system comprising:
a base having a base center line, a first base end, a second base end opposite and spaced apart from the first base end along the base center line, a first base side extending between the first base end and the second base end, and a second base side opposite and spaced apart from the first base side, wherein the base includes a top base side and a bottom base side opposite and spaced apart from the top base side, wherein the seat is closer to the top base side than it is to the bottom base side, wherein the base further includes a coupling flange extending along the entirety of each of the first base end, the second base end, the first base side, and the second base side, wherein the coupling flange is spaced apart from the bottom base side such that, when the one or more coupling coupling flange is coupled to a floor surface, the bottom base side is disposed opposite the floor surface from the coupling flange; and
a seat having a seat center line, a first seat end, a second seat end opposite and spaced apart from the first seat end along the seat center line, a first seat side extending between the first seat end and the second seat end, a second seat side opposite and spaced apart from the first seat side, and a bottom seat surface rotationally coupled to the base such that the seat is rotatable about a seat rotational axis between a first rotational position and a second rotational position,
wherein the seat is movable in a direction having a component vector in a direction parallel to the rotational axis and relative to the base between a raised position and a lowered position, wherein the seat is disposed above the coupling flange in the lowered position, and
wherein the base includes a four-bar linkage, wherein the four-bar linkage is movable to cause the seat to move between the raised position and the lowered position, wherein an end of the four-bar linkage is rotatably coupled to a portion of the base that is closer than the coupling flange to the bottom base side.

2. The system of claim 1, further comprising a hollow shaft rotationally coupling the seat to the base, wherein at least one wire extends through the hollow shaft.

3. The system of claim 1, wherein the base further includes a pivot hinge, wherein the bottom seat surface is rotationally coupled to the base by the pivot hinge.

4. The system of claim 1, further comprising a locking mechanism movable between a locked position and an unlocked position, wherein the seat is prevented from rotating between the first rotational position and the second rotational position in the locked position and is allowed to rotate between the first rotational position and the second rotational position in the unlocked position.

5. The system of claim 4, wherein the locking mechanism comprises a handle for moving the locking mechanism from the locked position to the unlocked position.

6. The system of claim 1, wherein the seat is movable parallel to the center line and relative to the base between a fore position and an aft position.

7. The system of claim 6, wherein the base includes one or more rails and one or more bearings slidably engaging the one or more rails, wherein the seat is movably coupled to the base by the one or more rails and the one or more bearings.

8. The system of claim 1, wherein the seat rotational axis is spaced apart from the seat center line such that the seat rotational axis is closer to the first seat side than it is to the second seat side.

9. The system of claim 8, wherein the seat rotational axis is spaced apart from the base center line such that the seat rotational axis is closer to the first base side than it is to the second base side.

10. The system of claim 1, wherein the base further includes a main portion and an intermediate portion, wherein the main portion includes the four-bar linkage, wherein the four-bar linkage is movable to cause the intermediate portion to move between a raised position and a lowered position, wherein the bottom seat surface is rotationally coupled to the intermediate portion of the base.

11. The system of claim 10, wherein the intermediate portion of the base includes one or more rails and one or more bearings slidably engaging the one or more rails, wherein the seat is movably coupled to the intermediate portion of the base by the one or more rails and the one or more bearings to cause the seat to move between a fore position and an aft position.

12. The system of claim 1, wherein the coupling flange includes one or more fasteners or defines one or more fastener openings for coupling the coupling flange to the floor surface.

13. The system of claim 1, wherein the base further includes a main portion and an intermediate portion coupled to the seat, wherein the intermediate portion is movable relative to the main portion, wherein the coupling flange outwardly from the main portion.

14. The system of claim 1, wherein one of the base or the seat includes a thrust bearing, wherein an other of the seat or the base contacts the thrust bearing.

15. The system of claim 14, wherein the thrust bearing comprises a plain bearing.

16. The system of claim 14, wherein the thrust bearing is circular.

17. The system of claim 14, wherein the thrust bearing comprises a self-lubricating material.

18. The system of claim 14, wherein the thrust bearing comprises an acetal bearing.

19. The system of claim 4, wherein the locking mechanism further includes two or more positional detents and a locking protrusion, wherein the locking mechanism is in the locked position when the locking protrusion is disposed in one of the two or more positional detents and the locking mechanism is in the unlocked position when the locking protrusion is disposed outside of the two or more positional detents.

* * * * *